(12) United States Patent
Hunter et al.

(10) Patent No.: US 12,005,627 B2
(45) Date of Patent: Jun. 11, 2024

(54) DUAL LAYER HEAT SHRINK TUBING

(71) Applicant: Zeus Industrial Products, Inc., Orangeburg, SC (US)

(72) Inventors: Cameron Hunter, Saint Matthews, SC (US); John Richard Campanelli, West Columbia, SC (US)

(73) Assignee: Zeus Company LLC, Orangeburg, SC (US)

(*) Notice: Subject to any disclaimer, the term of this patent is extended or adjusted under 35 U.S.C. 154(b) by 79 days.

(21) Appl. No.: 17/332,490

(22) Filed: May 27, 2021

(65) Prior Publication Data

US 2021/0370581 A1 Dec. 2, 2021

Related U.S. Application Data

(60) Provisional application No. 63/030,948, filed on May 28, 2020.

(51) Int. Cl.
*B32B 1/08* (2006.01)
*B29C 61/00* (2006.01)
*B29C 61/02* (2006.01)
*B29C 61/06* (2006.01)
*B32B 27/08* (2006.01)
(Continued)

(52) U.S. Cl.
CPC ........ *B29C 61/0616* (2013.01); *B29C 61/003* (2013.01); *B29C 61/025* (2013.01); *B32B 1/08* (2013.01); *B32B 27/08* (2013.01); *B32B 27/20* (2013.01); *B32B 27/304* (2013.01);
(Continued)

(58) Field of Classification Search
CPC . B29C 61/0616; B29C 61/003; B29C 61/025; B32B 1/08; B32B 27/08; B32B 27/20; B32B 27/304; B32B 27/32; B32B 27/36; B29K 2027/16; B29K 2027/18; B29D 23/00
See application file for complete search history.

(56) References Cited

U.S. PATENT DOCUMENTS

2010/0193106 A1 8/2010 Trapp
2014/0255633 A1 9/2014 Suzuki et al.
(Continued)

OTHER PUBLICATIONS

International Search Report and Written Opinion for PCT/US2021/034545, filed May 27, 2021—dated Oct. 4, 2021.

*Primary Examiner* — James C Yager
(74) *Attorney, Agent, or Firm* — Jessica L. Gorczynski; Womble Bond Dickinson (US) LLP (57) ABSTRACT

The present disclosure provides a dual layer heat shrink tube having: an inner polymeric layer with a thickness $t_1$ and an outer diameter $D_1$; and an outer, expanded polymeric layer with a thickness $t_2'$ and an outer diameter $D_2'$ obtained by expanding a polymer tube from $D_2$ to $D_2'$ and $t_2$ to $t_2'$ at a selected temperature so that $D_2'-2(t_2')>D_1$, wherein a ring cut from a cross-section of the dual layer heat shrink tube, slit into a rectangle and gripped at cut ends by tension grips within a DMA, and subjected to a temperature sweep of 3° C./min at a frequency of 1 Hz from the onset of a melting endotherm of the inner polymeric layer to that of the outer, expanded polymeric layer is greater than 1° C. and less than 12° C. The disclosure further provides associated methods for preparing and using such tubes, as well as to products comprising such tubes.

12 Claims, 7 Drawing Sheets

(51) Int. Cl.

| | | |
|---|---|---|
| | *B32B 27/20* | (2006.01) |
| | *B32B 27/30* | (2006.01) |
| | *B32B 27/32* | (2006.01) |
| | *B32B 27/36* | (2006.01) |
| | B29K 27/00 | (2006.01) |
| | B29K 27/18 | (2006.01) |

(52) U.S. Cl.
CPC .............. *B32B 27/32* (2013.01); *B32B 27/36* (2013.01); B29K 2027/16 (2013.01); B29K 2027/18 (2013.01)

(56) References Cited

U.S. PATENT DOCUMENTS

| | | |
|---|---|---|
| 2015/0233807 A1 | 8/2015 | Santner |
| 2017/0058115 A1 | 3/2017 | Suzuki et al. |
| 2017/0165950 A1 | 6/2017 | Leatherdale et al. |
| 2018/0193532 A1 | 7/2018 | Roof et al. |
| 2019/0185662 A1 | 6/2019 | Zhou et al. |

DUAL LAYER HEAT SHRINK TUBING

CROSS-REFERENCE TO RELATED APPLICATION

The present application claims priority to U.S. Provisional Patent Application No. 63/030,948, filed May 28, 2020, the content of which is incorporated by reference herein in its entirety.

FIELD OF THE INVENTION

The present application relates generally to heat shrink tubes, and to methods of producing and using such heat shrink tubes.

BACKGROUND

Heat shrink tubing generally comprises a plastic material that is extruded into a tubular form and expanded. The extruded and expanded tube is designed to shrink (i.e., decrease in diameter) when heated to a given temperature. As such, heat shrink tubing can serve various functions. It can provide a tight, protective jacketing to closely cover and insulate various elements (e.g., to protect them from abrasion and to provide thermal, chemical, moisture, and/or electrical insulation); it can serve to bundle certain elements together (i.e., within the same heat shrink tube); it can serve to seal/isolate certain elements from others; it can be used to join/fuse two elements, e.g., two tubes together; and it can serve to modify the properties of an underlying material (e.g., by closing around another material and shrinking that material as well). These capabilities render the tubing useful for various purposes and heat shrink tubing finds use across various fields, e.g., environmental, medical, chemical, electrical, optical, electronic, aerospace, automotive, and telecommunications fields. In the medical context, heat shrink tubing is particularly beneficial in designing increasingly small and more complex devices to be inserted into the body (e.g., catheters, endoscopes, etc.).

The suitability of a heat shrink tubing for any given application is dependent, at least in part, on the physical properties of the tubing, particularly after it has been subjected to heat. In particular, a dual layer heat shrink tubing comprises an outer heat shrink tubing/layer that advantageously contracts around a melting inner tubing/layer that flows upon the application of heat to adequately encapsulate the underlying component(s). Any voids or irregularities in the flowed polymeric heat shrink material or that arise upon cooling of the heat shrink material around the underlying component(s) may render the heat shrink tubing ineffective for its intended purpose. If the inner tube/layer melts early relative to the recovering tube/layer, or if the recovery force of the outer tube/layer is too high, the polymer flow upon heating the tubing will lead to an unacceptable increase in recovered tube length as well as overflow of the molten polymer out of the tube ends. If the recovery of the outer tube/layer occurs while the polymer of the inner tube is not sufficiently deformable, or if the recovery force of the outer tube/layer is too low, the underlying component may not be properly encapsulated.

It would be advantageous to provide alternative heat shrink tubing designs to ensure for adequate encapsulation of underlying component(s) and methods of ensuring that heat shrink tubings will function as desired, e.g., providing adequate encapsulation of underlying component(s).

SUMMARY

The disclosure provides composite heat shrink tubings, also referred to herein as "dual layer heat shrink tubings), which comprise a first, inner tube/layer within a second, outer tube/layer (i.e., a "tube-within-a-tube" structure). For purposes of this disclosure, the inner portion is referred to as the "inner tube," "inner polymeric tube," "inner layer," or "inner polymeric layer." Likewise, the outer portion is referred to as the expanded or oriented "outer tube," "outer polymeric tube," "outer layer," or "outer polymeric layer." The first and second tubes/layers are designed and uniquely evaluated on the basis of certain parameters to ensure that when deployed as a dual layer heat shrink tubing, the first, inner layer will melt and flow under heat while the second, outer layer contracts (serving as an effective heat shrink tubing). This design results in suitable encapsulation and protection of an underlying component or components upon the application of heat. This design can further allow for control over the change in length of the tube, overflow of the first, inner layer and presence of voids during recovery. Advantageously, dual layer heat shrink tubings prepared as described herein and recovered under the conditions stated can exhibit optimal encapsulation properties (few voids, little overflow) with an increase in recovered length of the outer layer less than about 20% of its original length.

The present disclosure includes, without limitation, the following embodiments.

Embodiment 1: A dual layer heat shrink tube comprising: an inner polymeric layer with a thickness $t_1$ and an outer diameter $D_1$; and an outer, expanded polymeric layer with a thickness $t_2'$ and an outer diameter $D_2'$ obtained by expanding a polymer tube from $D_2$ to $D_2'$ and $t_2$ to $t_2'$ at a selected temperature so that $D_2'-2(t_2')>D_1$, wherein a ring cut from a cross-section of the dual layer heat shrink tube, slit into a rectangle and gripped at cut ends by tension grips within a DMA, and subjected to a temperature sweep of 3° C./min at a frequency of 1 Hz from the onset of a melting endotherm of the inner polymeric layer (as determined by DSC) up to the onset of a melting endotherm of the outer, expanded polymeric layer (as determined by DSC) is greater than 1° C. and less than 12° C.

Embodiment 2: The dual layer heat shrink tube of Embodiment 1, wherein the outer, expanded polymeric layer comprises a fluoropolymer.

Embodiment 3: The dual layer heat shrink tube of Embodiment 2, wherein the outer, expanded polymeric layer comprises a fluoropolymer selected from the group consisting of PTFE, FEP, PFA, PEEK, PVDF, and combinations thereof.

Embodiment 4: The dual layer heat shrink tube of any of Embodiments 1-3, wherein the outer, expanded polymeric layer comprises a polyester.

Embodiment 5: The dual layer heat shrink tube of Embodiment 4, wherein the outer, expanded polymeric layer comprises poly(ethylene terephthalate) (PET).

Embodiment 6: The dual layer heat shrink tube of any of Embodiments 1-5, wherein the inner polymeric layer comprises a fluoropolymer.

Embodiment 7: The dual layer heat shrink tube of Embodiment 6, wherein the inner polymeric layer comprises a fluoropolymer selected from the group consisting of PFA, FEP, EFEP, PVDF, and combinations thereof.

Embodiment 8: The dual layer heat shrink tube of any of Embodiments 1-7, wherein the inner polymeric layer comprises a polyolefin.

Embodiment 9: The dual layer heat shrink tube of Embodiment 8, wherein the inner polymeric layer comprises a polyolefin selected from the group consisting of polyethylene (PE), polypropylene (PP), and combinations thereof.

Embodiment 10: The dual layer heat shrink tube of Embodiment 1, wherein the outer, expanded polymeric layer comprises or consists essentially of PTFE and the inner polymeric layer comprises or consists essentially of PFA.

Embodiment 11: The dual layer heat shrink tube of Embodiment 1, wherein the outer, expanded polymeric layer comprises or consists essentially of PTFE and the inner polymeric layer comprises or consists essentially of FEP.

Embodiment 12: The dual layer heat shrink tube of Embodiment 1, wherein the outer, expanded polymeric layer comprises or consists essentially of PFA and the inner polymeric layer comprises or consists essentially of FEP.

Embodiment 13: The dual layer heat shrink tube of Embodiment 1, wherein the outer, expanded polymeric layer comprises or consists essentially of PEEK and the inner polymeric layer comprises or consists essentially of FEP.

Embodiment 14: The dual layer heat shrink tube of Embodiment 1, wherein the outer, expanded polymeric layer comprises or consists essentially of FEP and the inner polymeric layer comprises or consists essentially of EFEP.

Embodiment 15: The dual layer heat shrink tube of Embodiment 1, wherein the outer, expanded polymeric layer comprises or consists essentially of FEP and the inner polymeric layer comprises or consists essentially of PVDF.

Embodiment 16: The dual layer heat shrink tube of any of Embodiments 1-15, wherein the outer, expanded polymeric layer is removable after being heat shrunk.

Embodiment 17: The dual layer heat shrink tube of any of Embodiments 1-16, wherein one or both of the inner polymeric layer and the outer, expanded polymeric layer comprises a filler.

Embodiment 18: The dual layer heat shrink tube of any of Embodiments 1-9 and 16-17, wherein one or both of the inner polymeric layer and the outer, expanded polymeric layer comprises a blend of polymers.

Embodiment 19: A shrunken dual layer tube, prepared by heating the dual layer heat shrink tube of any of Embodiments 1-18 such that the inner polymeric layer melts, forming an inner encapsulating layer and the outer, expanded polymeric layer contracts, forming an outer, contracted polymeric layer.

Embodiment 20: The shrunken dual layer tube of Embodiment 19, wherein the outer, contracted polymeric layer is removable.

Embodiment 21: An encapsulated component, comprising a component within the shrunken dual layer tube of any of Embodiments 19-20.

Embodiment 22: The encapsulated component of Embodiment 21, wherein the component is completely encapsulated by the inner encapsulating layer.

Embodiment 23: A method of encapsulating a component, comprising: applying the dual layer heat shrink tube of any of Embodiments 1-18 around the component, heating the dual layer shrink tube, and cooling the resulting encapsulated component.

Embodiment 24: A method for evaluating the suitability of a dual layer heat shrink tube, comprising: providing a dual layer heat shrink tube comprising an inner polymeric layer with a thickness $t_1$ and an outer diameter $D_1$; and an outer, expanded polymeric layer with a thickness $t_2'$ and an outer diameter $D_2'$; cutting a ring from a cross-section of the dual layer heat shrink tube, slitting the ring into a rectangle and position the rectangle so as to be gripped at its cut ends by tension grips within a DMA; subjecting the rectangle to a temperature sweep of 3° C./min at a frequency of 1 Hz from the onset of a melting endotherm of the inner polymeric layer (as determined by DSC) to the onset of a melting endotherm of the outer, expanded polymeric layer (as determined by DSC); and determining that the dual layer heat shrink tube is suitable for good encapsulation of an underlying component if the difference between the melting endotherm of the inner polymeric layer and the melting endotherm of the outer, expanded polymeric layer is greater than 1° C. and less than 12° C.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

DETAILED DESCRIPTION

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise.

The present disclosure provides dual layer heat shrink tubings, comprising a first, inner layer and a second, outer layer. The first, inner layer of the dual layer heat shrink tubings melts and flows at an elevated temperature, while the second, outer layer contracts, thereby encapsulating an underlying component or part. The inventors of the present disclosure have developed a systematic method of formulating a dual shrink tubing and evaluating a tubing prior to its deployment in a heat shrink capacity (i.e., before it is "recovered"). In particular, by considering the chemical composition and physical characteristics of both the inner layer and the outer layer, a dual layer tube can be provided which exhibits good encapsulation capabilities.

Various features affect the ability of a dual layer tube to exhibit good encapsulation capabilities, e.g., including but not limited to, the polymer flow of the inner layer leading to an unacceptable increase in recovered tube length (e.g., greater than 20% the original tube length) if the inner layer melts early relative to the recovering/outer layer, or if the recovery force of the outer layer is too high; or the underlying component not being properly encapsulated if the recovery of the outer tube occurs while the polymer of the inner tube is not sufficiently deformable, or if the recovery force of the outer layer is too low. Advantageously, the methods and tubings provided herein account for melt/flow and recovery characteristics of both layers in a non-isothermal environment, such that the tubings are provided that can exhibit excellent physical properties and functional properties in heat-shrink applications.

Figure 1:
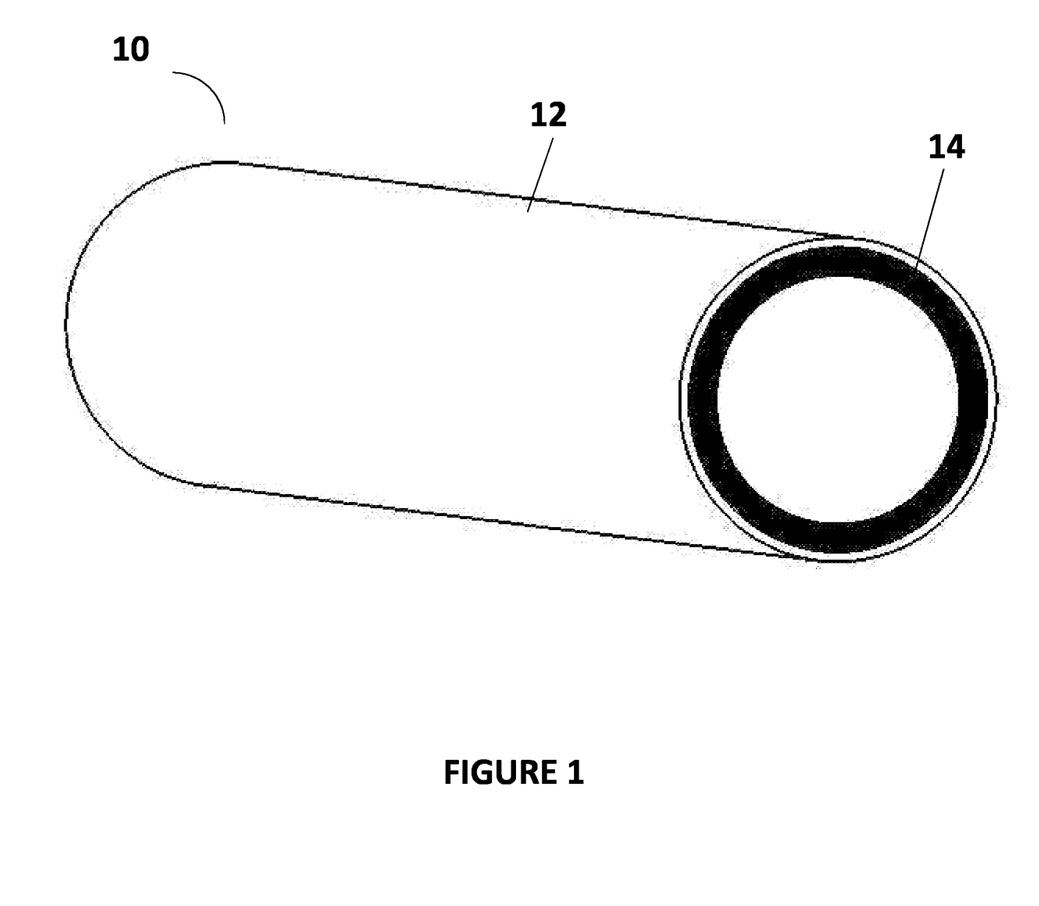
FIG. 1 is a general drawing of a portion of a dual layer heat shrink tubing 10 according to certain embodiments of the disclosure.

A general schematic of a dual layer heat shrink tubing is provided in FIG. 1. As shown therein, dual layer heat shrink tubing 10 comprises an outer, expanded layer 12 and an inner layer 14. At least a portion of the outer surface of inner layer 14 is typically in contact with at least a portion of the inner surface of outer, expanded layer 12. In certain embodiments, substantially the entirety (including the entirety) of the outer surface of inner layer 14 is typically in contact with at least a portion of the inner surface of outer, expanded layer 12. Advantageously, in some embodiments, the layers are in direct contact with one another (e.g., along the full length of dual layer heat shrink tubing 10, with no space therebetween. The overall size of the dual layer heat shrink tubing 10 can vary; the principles described herein are applicable to tubings of a wide range of sizes. In particular embodiments, the overall diameter of the dual layer heat shrink tubings provided herein (before recovery) range from about 2 mm to about 20 mm, e.g., about 4 mm to about 10 mm.

Outer, expanded layer 12 of the heat shrink tubing 10 is an expanded (e.g., oriented) heat shrinkable tube. For example, it can be an extruded tube that has been expanded, as outlined below. Outer, expanded layer 12 generally comprises a polymer or polymer blend that is capable of crystallizing or being cross-linked and then expanded radially to a larger diameter (which is then maintained by quenching the tube). Suitable polymers include thermoplastic materials. Layer 12 can comprise, e.g., a fluoropolymer and, in particular, a thermoplastic melt-processable fluoropolymer. Suitable fluoropolymers are known and include, but are not limited to, poly(tetrafluoroethylene) (PTFE), fluorinated ethylene propylene (FEP), polyvinylidene fluoride, perfluoroalkoxy alkane (PFA), perfluoro(alkyl vinyl ethers) (PAVE), a tetrafluoroethylene, hexafluoropropylene, vinylidine fluoride terpolymer (THV), polyvinylidene difluoride (PVDF), poly(ethylene-co-tetrafluoroethylene) (ETFE), ethylene chlorotrifluoroethylene (ECTFE), polychlorotrifluoroethylene (PCTFE), polytetrafluoroethylene (PTFE), ethylene, tetrafluoroethylene, and hexafluoropropylene (EFEP), tetrafluoroethylene and perfluoromethylvinyl ether copolymer (MFA), and copolymers and derivatives thereof. In some embodiments, outer, expanded layer 12 comprises a polyester, such as poly(ethylene terephthalate) (PET) or a derivative or copolymer thereof. Additional polymers for outer, expanded layer 12 are polyethylene, polypropylene, polyether block amide (PEBA), and polyaryletherketones such as PEEK. In certain embodiments, outer, expanded layer 12 comprises a single type of polymer; in other embodiments, outer, expanded layer 12 comprises two or more of the above-referenced polymers (e.g., in the form of a blend). In some embodiments, outer, expanded layer 12 can further comprise one or more additives, e.g., pigments, dyes, fillers, and the like. Certain non-limiting examples of pigments, dyes, and fillers include, e.g., graphene, carbon nanotubes, clays, organoclays, silica, silicates, zeolites, and functional additives to promote slip, impart color, impart conductivity, or provide antimicrobial characteristics.

Figure 2:
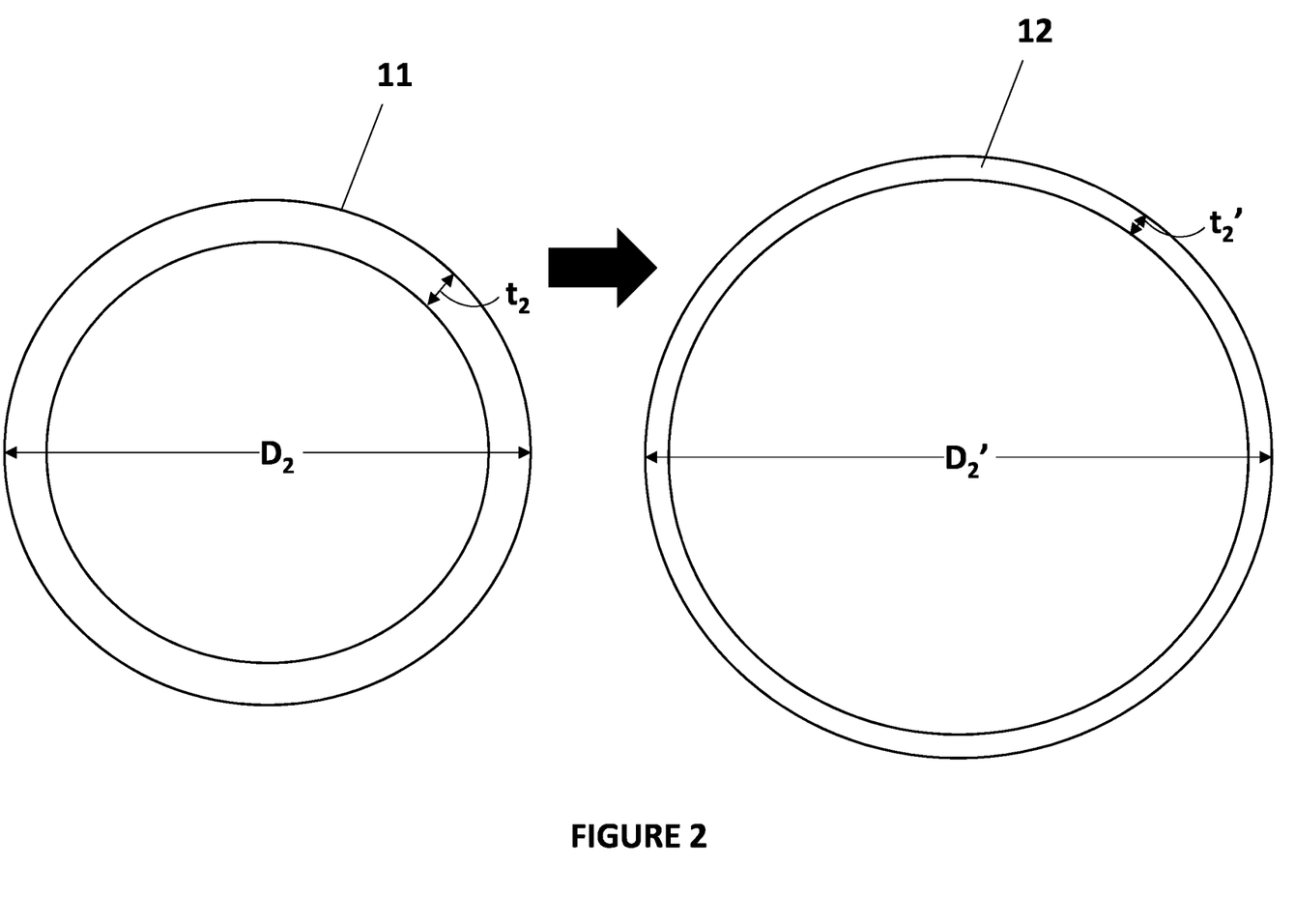
FIG. 2 is a schematic drawing of a method of expanding polymeric tube 11 to give expanded tube 12 (shown in cross-sectional view)
Figure 3:
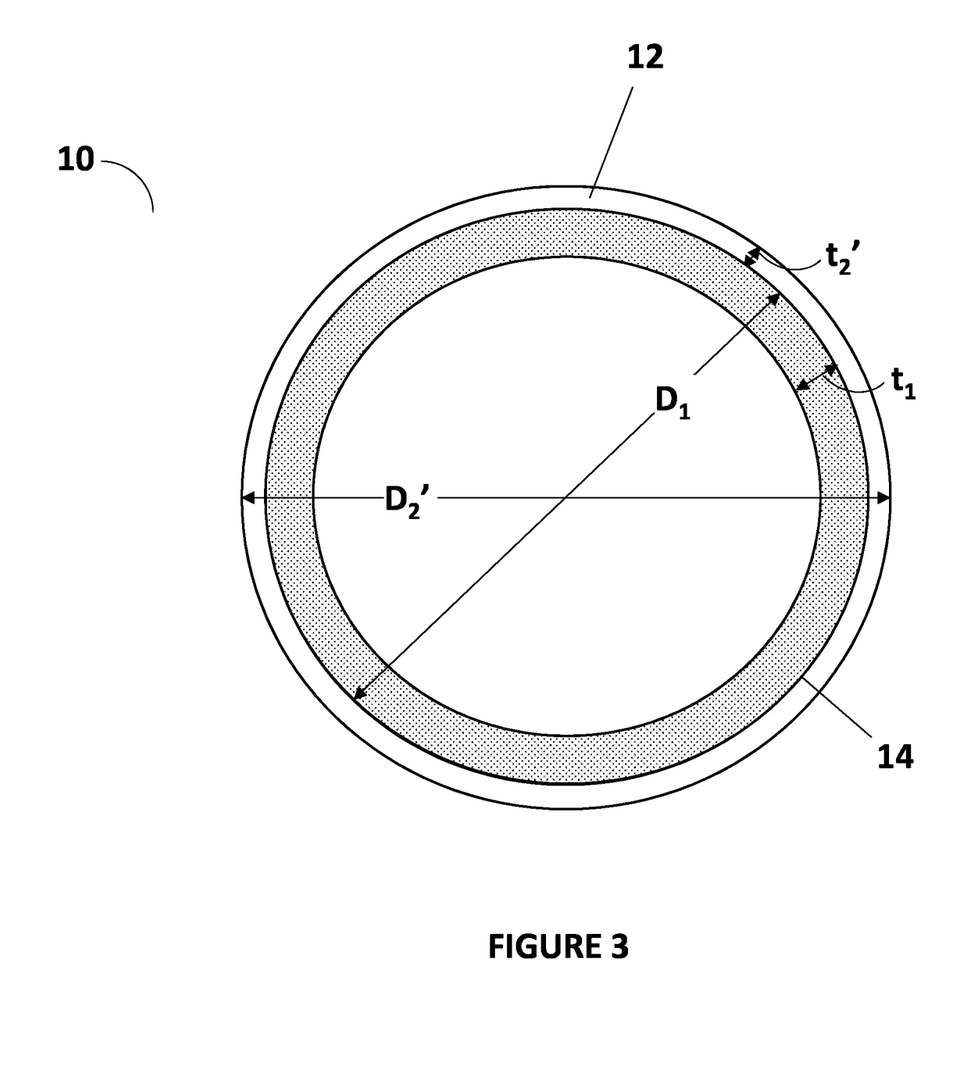
FIG. 3 is a schematic drawing of a dual layer heat shrink tubing 10 (shown in cross-sectional view) according to certain embodiments of the disclosure.

The outer, expanded layer 12 has a wall thickness of $t_2'$ and an outer diameter of $D_2'$. As shown in FIG. 3, outer, expanded layer 12 can be prepared, e.g., by providing a tube 11 and expanding it so as to decrease its wall thickness $t_2$ and to increase its outer diameter $D_2$. Methods of providing tube 11 are not particularly limited; in some embodiments, tube 11 is an extruded tube. Methods of expanding a tube are known in the art and the present disclosure is not limited to any particular method by which outer, expanded layer 12 is provided. Typically, tube 11 is radially expanded (e.g., by mechanical means) to provide an expanded tubing material that can function as a heat shrink material (i.e., a material which, when heated at or above a particular temperature, returns to its unexpanded form, and consequently "shrinks"). The expansion can be either in-line with production (e.g., extrusion) of tube 11, or offline (i.e., conducted independently of the production of tube 11). The expansion can be done at various temperatures (typically, elevated temperatures) including, but not limited to, temperatures above about 250° C. or above about 300° C. (e.g., about 330-350° C. in certain embodiments).

All means for radial expansion of tubing are intended to be encompassed by the present invention. In certain embodiments, the tubing is expanded radially by pressurizing the tubing from the inside out, introducing stress into the tube wall. This pressurizing can be conducted by any means capable of providing a differential pressure between the inside and outside of the tubing. Such differential pressure can be created by imposing a pressure above atmospheric pressure in the center of the tube, imposing a pressure below atmospheric pressure on the outside of the tube, or a combination of the two. The stress induced into the wall of the tube causes it to expand outward. The rate of expansion can be controlled so the tube will hold the expanded state and not recover until subjected to a further heat cycle.

The extent to which a tube 11 is expanded depends on the application for which the tubing is intended, and depends, at least in part, on the diameter ($D_1$) of the inner layer to be combined therewith. The tube 11 is generally expanded at a selected temperature such that $D_2'-2\times t_2'>D_1$. For example, in some embodiments, the tubing is expanded to an outer diameter $D_2'$ of from about 1.05 times its original (unexpanded) diameter $D_2$ to about 10 times its original (unexpanded) diameter $D_2$, such as from about 1.5 times its original (unexpanded diameter $D_2$ to about 4 times its original (unexpanded) diameter $D_2$ or about 2 times its original (unexpanded) diameter $D_2$ to about 4 times its original (unexpanded) diameter $D_2$. This expansion not only results in an increase in outer diameter $D_2$ to $D_2'$, but also results in a decrease in wall thickness ($t_2$ to $t_2'$). The values of $D_2$ and $t_2$ are not particularly limited; the principles outlined herein are applicable to tubings having a wide range of sizes. In some embodiments, $D_2$ is about 1 mm to about 30 mm. In some embodiments, $D_2'$ is about 2 mm to about 50 mm. In some embodiments, $t_2'$ is about 100 to about 500 µm, although the outer, expanded layer of the disclosed dual layered tubings are certainly not limited to such diameters and wall thicknesses.

In some embodiments, outer, expanded layer 12 is formulated in such a manner as to be easily removed, torn, or peeled away after recovery over the article to be encapsulated, thereby leaving only the inner layer 14 encapsulating the article. Such removability can include, e.g., the outer layer being simply pulled off after recovery. Certain suitable materials and preparation methods for such removable outer, expanded layers are, for example, as described in U.S. Pat. No. 9,440,044 to Roof et al., which is incorporated herein by reference. To promote ease of removal, in some embodiments, the material of the outer, expanded layer 12 is selected so as to be largely incompatible with the material of the inner layer 14, e.g., to avoid significant adherence between the two layers (which is likely to occur, e.g., where both layers are fluoropolymeric). One non-limiting example of such incompatibility, which can provide for a removable outer layer is a PEEK outer layer and a FEP inner layer. In some embodiments, the materials are selected such that the outer layer is not easily removable following recovery (e.g., it is intended to remain with the encapsulated component).

Inner layer 14 of the dual layer heat shrink tubing 10 is a tube, including, but not limited to, an extruded tube. In some embodiments, layer 14 is not expanded or oriented (although, during production of the dual layer heat shrink tube, in some embodiments, the layer may be expanded to some extent to provide the dual layer heat shrink tube). The inner layer 14 typically comprises a melt-processable polymer, and in particular, is selected from polymers or blends of polymers that soften and begin to flow before or at the temperature range where the material of the outer layer recovers. Inner polymeric layer 14 can comprise, e.g., a fluoropolymer and, in particular, a thermoplastic melt-processable fluoropolymer. Suitable fluoropolymers are known and include, but are not limited to, fluorinated ethylene propylene (FEP), polyvinylidene fluoride, perfluoroalkoxy alkane (PFA), perfluoro(alkyl vinyl ethers) (PAVE), a tetrafluoroethylene, hexafluoropropylene, vinylidine fluoride terpolymer (THV), polyvinylidene difluoride (PVDF), poly (ethylene-co-tetrafluoroethylene) (ETFE), ethylene chlorotrifluoroethylene (ECTFE), polychlorotrifluoroethylene (PCTFE), ethylene, tetrafluoroethylene, and hexafluoropropylene (EFEP), tetrafluoroethylene and perfluoromethylvinyl ether copolymer (MFA), and copolymers and derivatives thereof. Inner layer 12 can, in some embodiments, comprise polyamides, polyether block amide (PEBA) or polyethylene terephthalate (PET). In some embodiments, inner layer 12 of the dual layer heat shrink tubing 10 can comprise a polyolefin, and, in particular, a thermoplastic melt-processable polyolefin including, but not limited to, polyethylene or polypropylene. In certain embodiments, inner polymeric layer 14 comprises a single type of polymer; in other embodiments, inner polymeric layer 14 comprises two or more polymers (e.g., in the form of a blend).

In some embodiments, inner polymeric layer 14 can further comprise one or more additives, e.g., pigments, dyes, fillers, and the like. Certain non-limiting examples of pigments, dyes, and fillers include, e.g., graphene, carbon nanotubes, clays, organoclays, silica, silicates, zeolites, and functional additives to promote slip, impart color, impart conductivity, or provide antimicrobial characteristics. For example, in one embodiment, inner layer 14 comprises carbon black (e.g., in a relatively low amount, such as about 1% to about 10% by weight).

The size of the inner polymeric layer 14 can vary, although it is generally sufficiently small enough in outer diameter $D_1$ so as to fit within the inner diameter of expanded tube/layer 14. Similarly, the wall thickness $t_1$ of inner polymeric layer 14 is not particularly limited. In some embodiments, $t_1$ is about 25 µm to about 900 µm, although the dual layer tubings provided herein are not limited to such thicknesses. In some embodiments, $t_1$ is greater than $t_2'$ (i.e., the thickness of outer, expanded layer 12); in other embodiments, $t_1$ is less than $t_2'$.

According to the present disclosure, outer, expanded layer 12 and inner layer 14 are selected and combined in a particular manner designed to provide a suitable dual layer heat shrink tube. The properties of the individual resins selected for each layer, as well as the manner of expansion of the outer polymeric layer 12 (e.g., the rate, extent, and temperature of expansion) affect the overall performance of the resulting composite heat shrink tubing 10.

The inventors have evaluated certain interactions, e.g., taking into consideration the melt properties of inner layer 14, which advantageously is designed to melt/flow and the heat shrink properties of outer, expanded layer 12, which advantageously is designed to effectively encapsulate any underlying component(s). Mismatches between the melting/flowing of the inner layer and the recovery temperature and force of the outer, expanded layer can cause issues during encapsulation of a component (e.g., including, but not limited to, the presence of voids in the recovered/heat shrunk tube, unacceptable elongation of the tube, and overflow of the inner layer polymer outside the ends of the recovered tube). The principles of the present disclosure serve to address certain such difficulties in balancing the various properties of a dual layer heat shrink tube and obtain good encapsulation.

For example, such difficulties include, but are not limited to, the fact that the melting range of the inner layer polymer can be very large (e.g., spanning 40-50° C. for some polymers), thus making it difficult to determine the point at which the bulk of the melting polymer mass can flow to effectively encapsulate a part when a normal force is applied during heating. Moreover, the force applied by the shrinking tube as well as the melt viscosity are themselves functions of temperature. The situation can become further complicated if the method of heating the dual shrink tube does not operate at a steady temperature in the field application (i.e. through use of a heat gun). In addition, the viscosity of the inner layer polymer will vary with temperature and polymer type and grade, and the recovery force of the outer layer will also be a function of temperature as well as of wall thickness and expansion process parameters. Furthermore, the recovery process can itself be non-isothermal.

According to the present disclosure, dual layer heat shrink tubes can be provided that result from an evaluation process that considers the complex interactions of both layers in a non-isothermal environment and takes into consideration the concerns referenced above. More specifically, the disclosed method accounts for melt/flow and recovery characteristics simultaneously by evaluating the dynamic mechanical response of the entire composite structure over a wide range of temperatures. Thus, dual layer heat shrink tubes can be designed based on the net effect of the temperature-dependent deformation and flow of the combined structure. The inventors have recognized a method by which the interactions of complex phenomena in a dual layer heat shrink tubing can be understood so that a melting inner layer can be effectively deformed around a component by the recovering outer layer (during heat shrink deployment). Dual layer heat shrink tubings manufactured using the disclosed method can be thus optimized for recovered encapsulation quality. This process allows for efficient design of dual layer heat shrink tubings by combining an outer recoverable tube with an inner melting tube in a rapid DMA test to determine suitable/optimal combinations.

Figure 4:
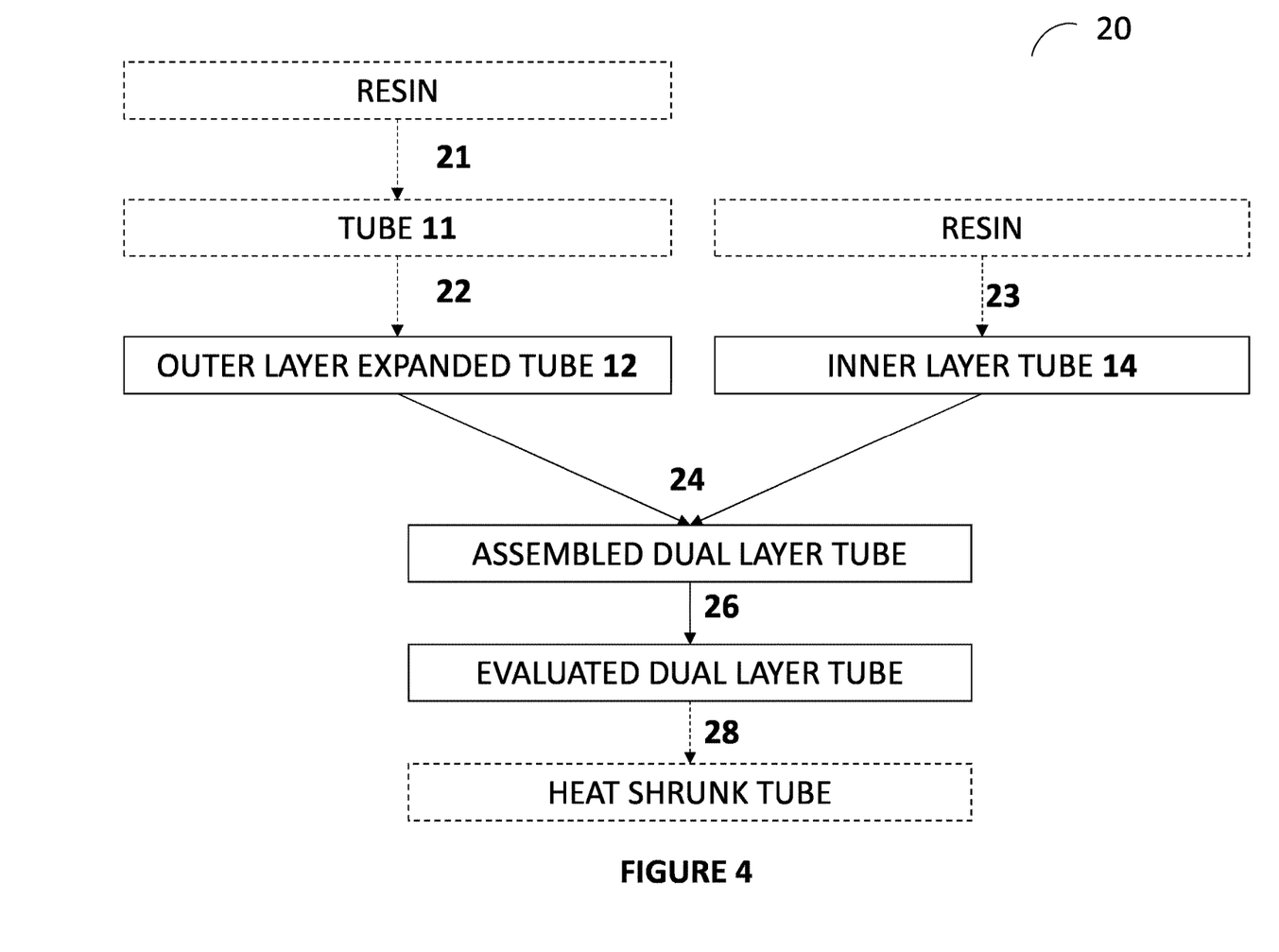
FIG. 4 is a general schematic of a process according to certain embodiments of the present disclosure.

A method for production of dual layer heat shrink tubes is shown in FIG. 4. As referenced above, the method generally involves combining an inner layer tube with an outer, expanded tube to give an assembled dual layer tube. Steps 21 (preparation of a tube, e.g., extrusion of a resin into a tube), 22 (expansion of the tube) and 23 (preparation of a tube, e.g., extrusion of a resin into a tube) are optional in the context of the disclosed process (i.e., one or both of inner layer tube and an outer layer expanded tube can be prepared via steps 21, 22, and/or 23) or these tubes can be provided and subjected to assembly step 24.

Assembly step 24 involves combining the inner and outer layers, both in tube form. These layers can be combined in conventional manners. For example, in some embodiments, the inner layer 14 is inserted into the outer, expanded layer 12 to form the dual layer heat shrink tube. In some embodiments, the inner layer 14 is expanded to some extent within and into outer, expanded layer 12, e.g., via the application of heat and/or pressure. In some embodiments, the outer, expanded layer 12 is partially recovered over the inner layer 14, e.g., by heating the outer layer.

Advantageously, upon assembly, a given dual layer heat shrink tube is subjected to evaluation 26 to determine whether the tube will serve as an effective heat shrink tube (with an effective heat shrink tube defined for purposes herein, e.g., as a heat shrunk material exhibiting few voids, little overflow, and change in recovered length less than about 20% the original length). The unique evaluation conducted at this stage is based, at least in part, on evaluating the area under the tan δ curve of the dual layer heat shrink tube in a DMA instrument undergoing a heating ramp. It has been discovered that for the composite tube, tan δ is influenced by both the softening and melting of the inner polymeric layer 14, and the recovery of the outer layer 12. In an increasing temperature ramp, tan δ grows rapidly as the inner layer softens and melts. Thus, the larger the integral of tan δ with temperature, the greater the propensity of the inner tube polymer to flow freely as it is heated. Eventually when the expansion temperature is reached, the recovery forces exerted by the outer layer 12 will cause tan δ of the composite structure to decrease as the polymer flow becomes increasingly constrained. The storage modulus, E', of the outer tube decreases with temperature until the expansion temperature is reached. At this point, a noticeable kink is seen in E' followed by an increase as the outer layer recovers. A kink in E'–T curve has been attributed to entropic elasticity such as would be seen in the recovery of a previously expanded sheet. See L. Andena et al., *Polym. Eng. Sci,* 44, 2004, 1368-1378, which is incorporated herein by reference. The E' curve decreases with temperature once more after all stresses have been relieved. It has now been found that the area under the tan δ curve calculated from the onset of melting of the inner tube through the onset of melting of the outer tube can be used to describe these competing phenomena. If the value of the area under the tan δ curve is below about 1° C., it had been found that the mobility of the polymer within the inner tube is insufficient to properly encapsulate the underlying component. If the value of this area is above about 12° C., it has been found the polymer within the inner tube flows freely outside the confines of the outer tube and does not properly encapsulate the underlying component. As such, the targeted value according to the present disclosure is 1° C. to 12° C., e.g., 2° C. to 12° C., 3° C. to 12° C., 4° C. to 12° C., or 5° C. to 12° C.

The evaluation 26 comprises providing the assembled dual layer tube to be evaluated, evaluating the area under a tan δ curve when the assembled dual layer tube is cut into a ring, slit into a rectangle and gripped by tension grips holding the cut ends of the rectangle within a DMA, and subjected to a temperature sweep of 3° C./min at a frequency of 1 Hz from the onset of a melting endotherm of the inner layer (as determined by DSC) up to the onset of a melting endotherm of the outer layer (as determined by DSC). It is determined that the combination of inner and outer layer provide a suitable combination of inner and outer layers if: a) the area under the tan δ curve is less than about 12° C. and greater than about 1° C. By ensuring that a given combination of inner and outer layers exhibits such properties, the inventors have found it can be reasonably predicted that a dual layer heat shrink tube has been produced, which will exhibit acceptable heat shrink/encapsulation properties upon recovery, e.g., few voids, little overflow) with a change in recovered length less than about 20% of the original length. This novel procedure allows for rapid design of dual layer heat shrink tubing by combining an outer, recoverable layer with an inner, melting layer in the DMA and evaluating the results, without the need to produce production quantities of such tubings to test.

The dual layer heat shrink tubings provided herein can find application in a range of fields. For example, they may be used in various medical contexts, as well as in environmental, medical, chemical, electrical, optical, electronic, aerospace, automotive, and telecommunications fields. As such, the disclosure includes components (e.g., environmental, medical, chemical, or electrical, optical, electronic, aerospace, automotive, or telecommunication components) encapsulated within a tubing, e.g., prepared by recovering a dual layer heat shrink tubing around such components). Similarly, methods for encapsulating components effectively (e.g., meeting the criteria mentioned herein) are encompassed by the disclosure. These methods can result in components encapsulated by the two layers provided herein (the recovered outer layer and the melted inner layer) and, in some embodiments, where the recovered outer layer is removable, the final encapsulated component can comprise only a coating of the inner layer material.

EXAMPLES

Aspects of the present invention are more fully illustrated by the following examples, which are set forth to illustrate certain aspects of the present invention and are not to be construed as limiting thereof.

A TA Instruments DSC Q2000 was used to study the thermal behavior of both the inner and outer tubes of the composite sample in order to determine the onset of the melting region for both inner and outer tubes. The sample was first equilibrated at −60° C. and heated at a constant rate of 10° C./min to 400° C. The onset of the melting region was then determined using TA Instruments Universal Analysis 2000 v4.5A software.

A TA instruments Q800 DMA equipped with the film-tension fixture operating in tension mode was used to determine the thermo-mechanical properties of the composite tube, with the main property of interest being tan delta (δ). The composite tube was cut perpendicular to its length forming an annulus that was subsequently slit open into a rectangular test specimen. Both layers of the rectangular test specimen were placed in the tension grips with the slit circumference of the tube thus being parallel to the plane of the grips. A temperature ramp was performed at a constant rate of 3° C./min and the test frequency was 1 Hz. Upon completion of the temperature scan, the DMA data was imported into TA instruments TRIOS software v4.3. Raw data files were exported to MS Excel 2016. The Excel data files were then imported into OriginLab's OriginPro 2020 v.9.7 data analysis and graphing software and tan delta vs. temperature plotted. Using OrginLab's integration gadget, the area of the tan delta with respect to temperature was calculated with the lowermost temperature limit being the onset temperature of the melting endotherm of the inner tube determined by DSC and the uppermost temperature limit being the onset temperature of the melting endotherm of the outer tube determined by DSC with the region of interest (ROI) being between these two limits. For all calculations, the baseline was set at y=0 (i.e., tan δ=0).

The encapsulation quality was evaluated as follows. The composite tube having a length of about 15 cm was placed over a mandrel that was equal to 60%±10% of the inner diameter of the composite tube. Using a forced air oven, recovery was performed at a temperature higher than the initial expansion temperature. At 10 minutes the encapsulated mandrel was removed from the oven and set aside to cool to ambient. Once cool, the outer layer of the recovered composite tube was measured to determine percent longitudinal change. An increase in length exceeding 15% of the initial length, or a reduction in length exceeding 2% of the initial length was indicative of a faulty encapsulation. A visual inspection was then performed to ensure the absence of large voids, i.e. exceeding 2 mm in diameter. If the overflow of the molten polymer from each end of the recovered outer tube was greater than 5 mm in width, the encapsulation was deemed to be faulty.

Comparative Example 1

Figure 5:
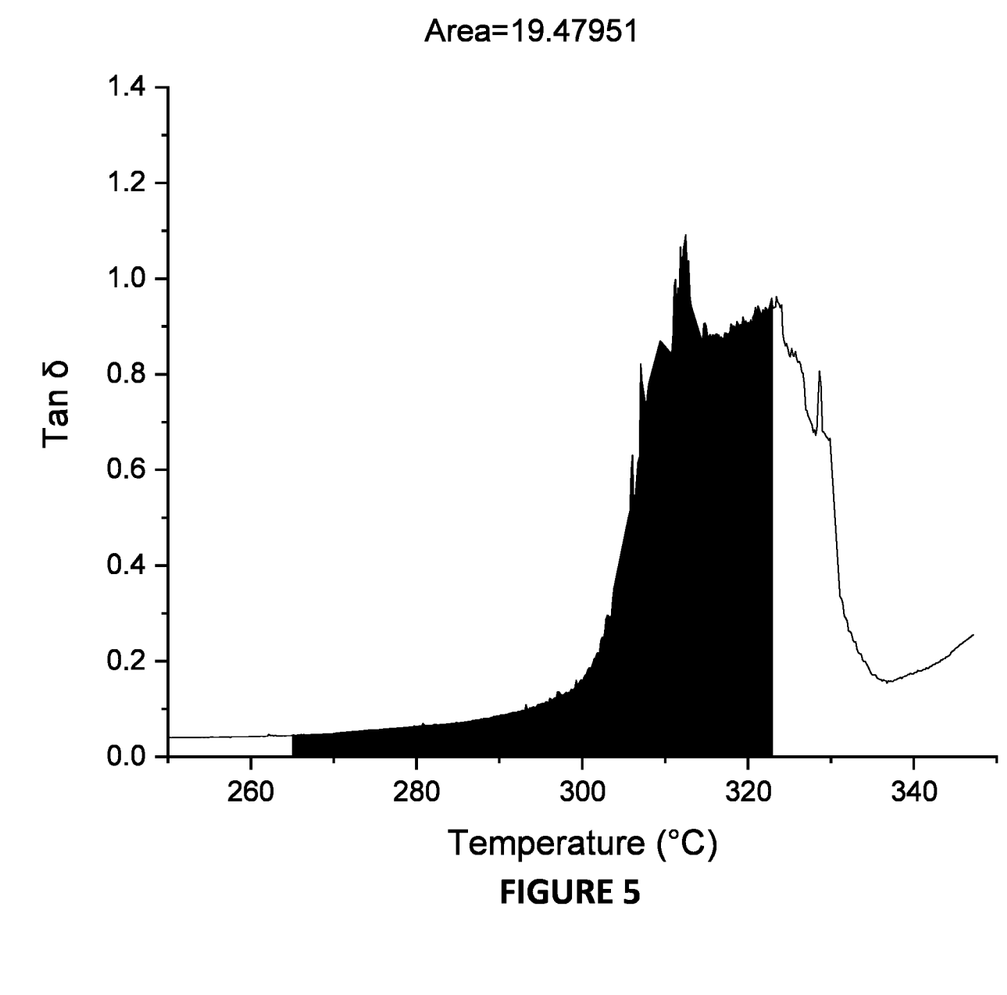
FIG. 5 is a plot of DMA temperature sweep of a dual-layer tube of Comparative Example 1 with calculation of tan δ area.

A dual layer heat shrink tube with initial outer diameter of 3.59 mm was manufactured with an outer layer of PTFE (104 µm wall thickness) expanded between 330° C. and 350° C. at a ratio of 2:1 and an inner layer of PFA (315 µm wall thickness). The onset of melting from the DSC endotherm was determined to be 265° C. for the PFA. The onset of melting from the DSC endotherm was determined to be 323° C. for the PTFE. Recovery was carried out in a hot air circulating oven at 350° C. for 5 minutes. A DMA temperature sweep was carried out at 1 Hz on a rectangular sample cut from the circumference of the original composite tube and slit open. The area under the tan δ curve from 265° C. to 323° C. was determined to be 19.48° C. The E' curve showed a positive slope around the recovery temperature. Upon recovery/heat shrink at 350° C. over a mandrel having a diameter of 1.74 mm, the encapsulation of the mandrel was found to have voids with a change in length of −4.6%, but with significant overflow of the PFA layer. FIG. 5 shows a DMA temperature sweep of the dual layer heat shrink tube, showing calculation of tan δ area from 265° C. to 323° C.

Example 1

Figure 6:
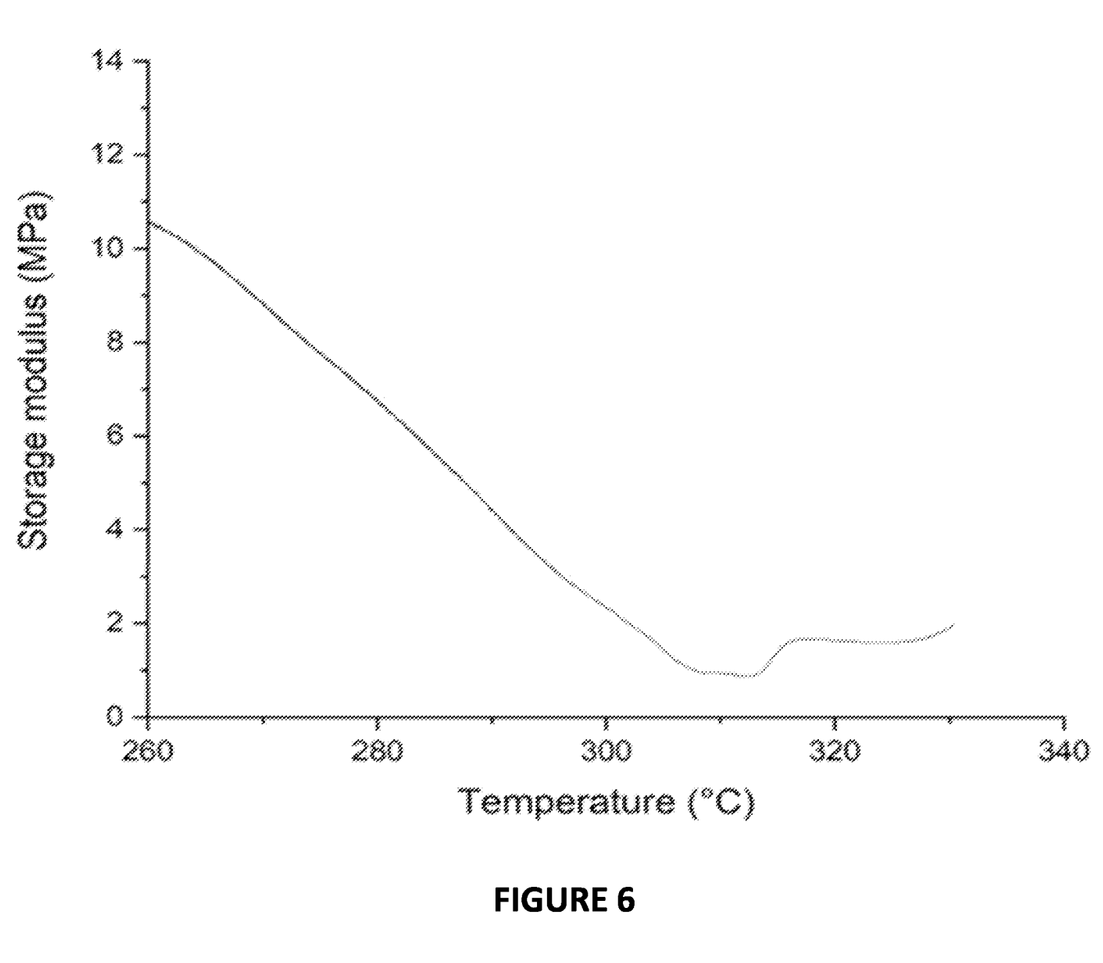
FIG. 6 is a plot of storage modulus versus temperature from a DMA sweep of a dual layer heat shrink tube from Example 1.

A dual layer heat shrink tube with initial outer diameter of 3.52 mm was manufactured with an outer layer of PTFE (with a wall thickness of 107 µm) expanded between 330 and 350° C. at a ratio of 2:1 and an inner layer of PFA (with a wall thickness of 219 µm). The onset of melting from the DSC endotherm was determined to be 265° C. for the PFA. The onset of melting from the DSC endotherm was determined to be 323° C. for the PTFE. The tube was recovered/shrunk over a mandrel of 1.48 mm at 350° C. for 10 minutes. A DMA temperature sweep was carried out at 1 Hz on a rectangular sample cut from the circumference of the original composite tube and slit open. The results are shown in Table 1. FIG. 6 shows the change in modulus for the dual layer heat shrink tube as a function of temperature.

Example 2

A dual layer heat shrink tube with initial outer diameter of 8.37 mm was manufactured with an outer layer of PTFE (with a wall thickness of 162 µm) expanded between 330 and 350° C. at a ratio of 2:1 and an inner layer of PFA (with a wall thickness of 315 µm). The onset of melting from the DSC endotherm was determined to be 265° C. for the PFA. The onset of melting from the DSC endotherm was determined to be 323° C. for the PTFE. The tube was recovered/heat shrunk over a mandrel of 3.83 mm at 350° C. for 10 minutes. A DMA temperature sweep was carried out at 1 Hz on a rectangular sample cut from the circumference of the original composite tube and slit open. The results are shown in Table 1.

Comparative Example 2

A dual layer heat shrink tube with an initial outer diameter of 5.85 mm was manufactured with an outer tube of unexpanded PTFE (365 µm wall thickness) and an inner tube of PVDF (445 µm wall thickness). The onset of melting from the DSC endotherm was determined to be 160° C. for the PVDF. The onset of melting from the DSC endotherm was determined to be 323° C. for the PTFE. The dual layer heat shrink tube was recovered over a mandrel of 4.37 mm at 350° C. for 10 minutes. A DMA temperature sweep was carried out at 1 Hz on a rectangular sample cut from the circumference of the original composite tube and slit open. The results are shown in Table 1.

Example 3

A dual layer heat shrink tube with initial outer diameter of 4.22 mm was manufactured with an outer layer of PTFE (with a wall thickness of 260 µm) expanded between 330 and 350° C. at a ratio of 2:1 and an inner layer of PFA (with a wall thickness of 315 µm). The onset of melting from the DSC endotherm was determined to be 265° C. for the PFA. The onset of melting from the DSC endotherm was determined to be 323° C. for the PTFE. The tube was recovered/heat shrunk over a mandrel of 1.91 mm at 350° C. for 10 minutes. A DMA temperature sweep was carried out at 1 Hz on a rectangular sample cut from the circumference of the original composite tube and slit open. The results are shown in Table 1.

Comparative Example 3

A dual layer heat shrink tube with initial outer diameter of 14.06 mm was manufactured with an outer layer of PTFE (with a wall thickness of 251 μm) expanded between 330 and 350° C. at a ratio of 2:1 and an inner layer of FEP (with a wall thickness of 750 μm). The onset of melting from the DSC endotherm was determined to be 235° C. for the FEP. The onset of melting from the DSC endotherm was determined to be 330° C. for the PTFE. The tube was recovered/heat shrunk over a mandrel of 6.53 mm at 350° C. for 10 minutes. A DMA temperature sweep was carried out at 1 Hz on a rectangular sample cut from the circumference of the original composite tube and slit open. The results are shown in Table 1.

Example 4

Figure 7:
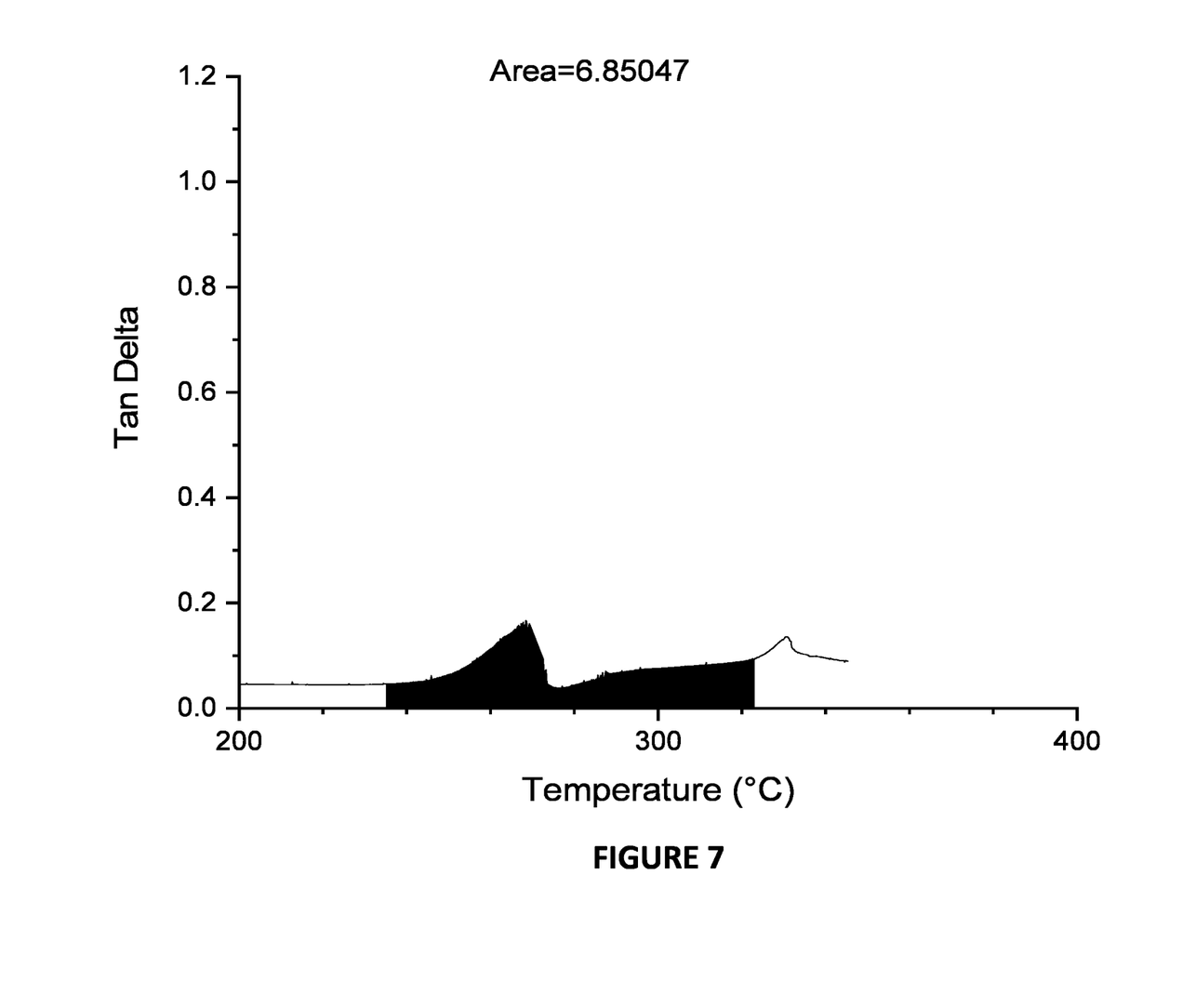
FIG. 7 is a plot of DMA temperature sweep of a dual-layer tube of Example 4 with calculation of tan δ area from 235° C. to 323° C.

A dual layer heat shrink tube with initial outer diameter of 4.22 mm was manufactured with an outer layer of PTFE (with a wall thickness of 260 μm) expanded between 330 and 350° C. at a ratio of 2:1 and an inner layer of FEP (with a wall thickness of 200 μm). The onset of melting from the DSC endotherm was determined to be 235° C. for the FEP. The onset of melting from the DSC endotherm was determined to be 323° C. for the PTFE. The tube was recovered/heat shrunk over a mandrel of 1.90 mm at 350° C. for 10 minutes. A DMA temperature sweep was carried out at 1 Hz on a rectangular sample cut from the circumference of the original composite tube and slit open. The results are shown in Table 1 and in FIG. 7.

Comparative Example 4

A dual layer heat shrink tube with an initial outer diameter of 7.88 mm was manufactured with an outer tube of PTFE (200 μm wall thickness) expanded between 330 and 350° C. at a ratio of 2:1, and an inner layer of PFA filled with 4% w/w carbon black (51 μm wall thickness). The onset of melting from the DSC endotherm was determined to be 290° C. for the filled PFA. The onset of melting from the DSC endotherm was determined to be 323° C. for the PTFE. The dual layer heat shrink tube was recovered/heat shrunk over a mandrel of 4.17 mm at 350° C. for 10 minutes. A DMA temperature sweep was carried out at 1 Hz on a rectangular sample cut from the circumference of the original composite tube and slit open. The results are shown in Table 1.

Example 5

A dual layer heat shrink tube with an initial outer diameter of 7.88 mm was manufactured with an outer tube of PTFE (200 μm wall thickness) expanded between 330 and 350° C. at a ratio of 2:1, and an inner layer of FEP filled with 15% w/w carbon black (358 μm wall thickness). The onset of melting from the DSC endotherm was determined to be 265° C. for the FEP blend. The onset of melting from the DSC endotherm was determined to be 330° C. for the PTFE. The tube was recovered/heat shrunk over a mandrel of 2.28 mm at 350° C. for 10 minutes. A DMA temperature sweep was carried out at 1 Hz on a rectangular sample cut from the circumference of the original composite tube and slit open. The results are shown in Table 1.

Example 6

A dual layer heat shrink tube with an initial outer diameter of 4.19 mm was manufactured with an outer tube of FEP (435 μm wall thickness) expanded between 180 and 220° C. at a ratio of 1.6:1, and an inner layer of EFEP (254 μm wall thickness). The onset of melting from the DSC endotherm was determined to be 175° C. for the EFEP. The onset of melting from the DSC endotherm was determined to be 245° C. for the FEP. The tube was recovered/heat shrunk over a mandrel of 1.42 mm at 350° C. for 10 minutes. A DMA temperature sweep was carried out at 1 Hz on a rectangular sample cut from the circumference of the original composite tube and slit open. The results are shown in Table 1.

Example 7

A dual layer heat shrink tube with an initial outer diameter of 5.95 mm was manufactured with an outer tube of PTFE (284 μm wall thickness) expanded between 330 and 350° C. at a ratio of 2:1, and an inner layer of PVDF (445 μm wall thickness). The onset of melting from the DSC endotherm was determined to be 160° C. for the PVDF. The onset of melting from the DSC endotherm was determined to be 323° C. for the PTFE. The tube was recovered/heat shrunk over a mandrel of 2.22 mm at 350° C. for 10 minutes. A DMA temperature sweep was carried out at 1 Hz on a rectangular sample cut from the circumference of the original composite tube and slit open. The results are shown in Table 1.

Example 8

A dual layer heat shrink tube with an initial outer diameter of 6.29 mm was manufactured with an outer tube of FEP (262 μm wall thickness) expanded between 180 and 220° C. at a ratio of 1.3:1, and an inner layer of PVDF (445 μm wall thickness). The onset of melting from the DSC endotherm was determined to be 160° C. for the PVDF. The onset of melting from the DSC endotherm was determined to be 240° C. for the FEP. The tube was recovered/heat shrunk over a mandrel of 2.51 mm at 220° C. for 10 minutes. Once removed from the oven, it was discovered that the outer FEP tube could easily be removed from the inner PVDF tube. A DMA temperature sweep was carried out at 1 Hz on a rectangular sample cut from the circumference of the original composite tube and slit open. The results are shown in Table 1.

TABLE 1

Summary of Test Results

| Example | Temp. Range for Integration | Area under tan δ curve, ° C. | Δ % Length +15%, −2% | Over-flow >5 mm | Overall Rating |
|---|---|---|---|---|---|
| Comp. 1 | 265-323° C. | 19.5 | −4.6 | Yes | Poor |
| Comp. 2 | 160-323° C. | 59.6 | −10.4 | No | Poor |
| Ex. 1 | 265-323° C. | 7.6 | 9.9 | No | Good |
| Ex. 2 | 265-323° C. | 6.9 | 3.5 | No | Good |
| Ex. 3 | 265-323° C. | 2.5 | 7.3 | No | Good |
| Comp. 3 | 235-323° C. | 13.0 | −2.4 | No | Poor |
| Ex. 4 | 235-323° C. | 6.9 | 6.6 | No | Good |
| Comp. 4 | 290-323° C. | 1.0 | 20.8 | No | Poor |
| Ex. 5 | 240-323° C. | 7.7 | 6.5 | No | Good |
| Ex. 6 | 175-243° C. | 4.3 | 10.4 | No | Good |
| Ex. 7 | 160-323° C. | 10.7 | 7.3 | No | Good |
| Ex. 8 | 160-240° C. | 9.1 | 1.0 | No | Good |

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A dual layer heat shrink tube comprising:
an inner polymeric layer consisting essentially of PFA, FEP, EFEP, or PVDF and, optionally, one or more pigments, dyes, or fillers, with a thickness $t_1$ and an outer diameter $D_1$; and
an outer, expanded polymeric layer consisting essentially of PTFE, FEP, PFA, PEEK, or PVDF with a thickness $t_2'$ and an outer diameter $D_2'$ obtained by expanding a polymer tube from $D_2$ to $D_2'$ and $t_2$ to $t_2'$ at a selected temperature so that $D_2'-2(t_2')>D_1$,
wherein a ring cut from a cross-section of the dual layer heat shrink tube, slit into a rectangle and gripped at cut ends by tension grips within a DMA, and subjected to a temperature sweep of 3° C./min at a frequency of 1 Hz from the onset of a melting endotherm of the inner polymeric layer (as determined by DSC) up to the onset of a melting endotherm of the outer, expanded polymeric layer (as determined by DSC) has an area under a tan δ curve that is greater than 1° C. and less than 12° C.

2. The dual layer heat shrink tube of claim 1, wherein the outer, expanded polymeric layer consists essentially of a fluoropolymer selected from PTFE, FEP, PFA, and PVDF.

3. The dual layer heat shrink tube of claim 1, wherein the outer, expanded polymeric layer consists essentially of PTFE and the inner polymeric layer consists essentially of PFA.

4. The dual layer heat shrink tube of claim 1, wherein the outer, expanded polymeric layer consists essentially of PTFE and the inner polymeric layer consists essentially of FEP.

5. The dual layer heat shrink tube of claim 1, wherein the outer, expanded polymeric layer consists essentially of PFA and the inner polymeric layer consists essentially of FEP.

6. The dual layer heat shrink tube of claim 1, wherein the outer, expanded polymeric layer consists essentially of PEEK and the inner polymeric layer consists essentially of FEP.

7. The dual layer heat shrink tube of claim 1, wherein the outer, expanded polymeric layer consists essentially of FEP and the inner polymeric layer consists essentially of EFEP.

8. The dual layer heat shrink tube of claim 1, wherein the outer, expanded polymeric layer consists essentially of FEP and the inner polymeric layer consists essentially of PVDF.

9. The dual layer heat shrink tube of claim 1, wherein the outer, expanded polymeric layer is removable after being heat shrunk.

10. The dual layer heat shrink tube of claim 1, wherein the inner polymeric layer comprises a filler.

11. The dual layer heat shrink tube of claim 1, wherein the inner polymeric layer is not an expanded polymeric layer.

12. The dual layer heat shrink tube of claim 1, wherein the inner polymeric layer is not an oriented polymeric layer.

* * * * *